(12) United States Patent
Goering et al.

(10) Patent No.: US 6,349,528 B1
(45) Date of Patent: Feb. 26, 2002

(54) DRIVE STRUCTURE FOR TRANSVERSITY ADJUSTABLE HARVESTER ROW UNITS

(75) Inventors: Kevin Jacob Goering, Cambridge; Brian Robert Koesters, Urbandale, both of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/586,117

(22) Filed: Jun. 2, 2000

(51) Int. Cl.[7] .............................................. A01D 45/02
(52) U.S. Cl. .............................. 56/14.2; 56/98; 56/106
(58) Field of Search ................... 56/33, 13.5, 103–106, 56/14.3, 14.2, 98

(56) References Cited

U.S. PATENT DOCUMENTS

| | | | |
|---|---|---|---|
| 3,585,789 A | * | 6/1971 | Blanshine ...................... 56/98 |
| 3,589,110 A | * | 6/1971 | Schreiner ..................... 56/11.7 |
| 3,736,733 A | * | 6/1973 | Fell et al. ....................... 56/98 |
| 3,759,021 A | | 9/1973 | Schreiner et al. ............. 56/106 |
| 3,791,117 A | * | 2/1974 | Lawrence ....................... 56/98 |
| 3,808,783 A | | 5/1974 | Sutherland et al. ........... 56/106 |
| 3,832,836 A | * | 9/1974 | Anderson ..................... 56/104 |
| 3,858,384 A | * | 1/1975 | Maiste et al. ................ 56/14.2 |
| 3,982,384 A | | 9/1976 | Rohweder et al. ............ 56/106 |
| 4,072,002 A | * | 2/1978 | Heller et al. .................... 56/53 |
| 4,115,983 A | * | 9/1978 | Barnes et al. .................. 56/98 |
| 4,222,218 A | * | 9/1980 | Moe ............................. 56/104 |
| 4,227,366 A | * | 10/1980 | Pucher ........................ 56/14.2 |
| 4,244,162 A | * | 1/1981 | Pucher ........................ 56/14.2 |
| 4,337,612 A | * | 7/1982 | Dean et al. ..................... 56/98 |
| RE31,064 E | * | 10/1982 | Shriver .......................... 56/98 |
| 4,434,606 A | * | 3/1984 | Rhodes et al. ................ 56/106 |
| 5,311,728 A | | 5/1994 | Schlueter ....................... 56/33 |
| 5,394,679 A | | 3/1995 | Schlueter ....................... 56/30 |
| 5,916,113 A | * | 6/1999 | Johnson .......................... 56/94 |

* cited by examiner

*Primary Examiner*—Robert E. Pezzuto
*Assistant Examiner*—Árpád Fábián Kovács

(57) ABSTRACT

A harvester drive system includes a main hexagonal cross shaft which may be either continuous or include short shaft sections joined by couplers. Row units are pivotally connected to a cross auger housing for pivoting about the axis of the cross shaft and can slide relative to the cross auger and the drive shaft to accommodate different row spacings. A slip clutch and bevel gear assembly, which slides on the cross shaft, drives each row unit and permits simple transverse adjustments of the units. A cross shaft extension is added if harvesting widths are needed which cannot be provided by the original shaft. Each row unit drive extends forwardly from the bevel gear, and a sturdy bearing mount arrangement connected to the row unit wall immediately adjacent the bevel gear maintains proper gear mesh.

14 Claims, 5 Drawing Sheets

DRIVE STRUCTURE FOR TRANSVERSITY ADJUSTABLE HARVESTER ROW UNITS

BACKGROUND OF THE INVENTION

1.) Field of the Invention

The present invention relates generally to agricultural implements such as cotton harvesters, and, more specifically, to a cross shaft row unit drive for such implements.

2.) Related Art

Implements such as cotton strippers include row units which are transversely adjustable on an auger housing connected to the harvester frame by a lift system. Each of the row units is driven by a complex arrangement of belts and sheaves mounted to jackshaft assemblies. A universal joint drive shaft connects drive to each unit. When the row units are lifted, a phase shift in the universal joint causes a torsional vibration in the drive and unit drive gear backlash so that noise and wear are increased. The acceleration and deceleration of all the rotating components also increase drive motor load. Much of the torque delivered by the drive motor is required to operate the drive components and overcome the negative effects of the phase shift. The previously available drive systems tend to be expensive and heavy and make row unit spacing changes difficult and time consuming. To move the units, the operator must move all of the jackshaft assemblies and change the belts since the belt length necessary is a function of the row unit spacing. Regular lubrication of the drive shafts is also required.

With some previous drive systems, the header supporting the row units can only be extended in one direction because of unique drive components on one side. As a result, to increase row capacity up to eight rows, a completely different header is necessary. The ability of custom operators and new purchasers of the implements to reconfigure the header for their particular row spacing requirements is limited. Reconfiguration of the header often requires different parts, and unnecessary original components supplied with the header are wasted.

Many current row unit drive systems include a drive belt for the cross auger wherein the drive sheave axis is at an angle of ninety degrees relative to the axis of the driven sheave. The drive therefore requires two idler pulleys to guide the belt around a corner. If the idlers are not precisely adjusted, the belt will come off. Belt life is significantly reduced because of the tortuous path.

BRIEF DESCRIPTION OF THE INVENTION

It is therefore an object of the invention to provide an improved drive system for a harvester having transversely adjustable row units. It is a further object to provide such a system which overcomes most or all of the aforementioned problems.

It is another object of the present invention to provide an improved drive system for a harvester which is more compact, more cost effective and requires less maintenance than at least most previously available drive systems. It is another object to provide a system which is particularly useful for implements such as cotton strippers which have slidably adjustable row units and which may require frequent row unit spacing changes to accommodate different row spacings in the field.

It is yet another object of the invention to provide an improved drive system for row harvesting units on an implement such as a cotton harvester which eliminates belt and jackshaft changes when row spacing is changed and substantially reduces operator time to switch from one row spacing to another. It is a further object to provide such a system having reduced vibration, gear backlash and noise. It is another object to provide such a system which eliminates phase shift problems caused by universal joints and which takes less power to drive.

It is yet a further object of the invention to provide an improved drive system for row harvesting units which is more compact, less expensive, quieter, and more reliable and requires less power and maintenance than at least most previously available drive systems. It is a further object to provide such a drive system which facilitates configuration of the harvesting units in numerous patterns and for different row capacities, and which permits headers which support the row units to be extended on either side without need for parts changes.

It is a further object of the invention to provide an improved drive system for the row units of a cotton stripper having reduced noise output, less maintenance requirements and easier adjustability than at least most previously available systems.

A harvester drive system constructed in accordance with the teachings of the present invention includes a main hexagonal cross shaft which may be either continuous or include short shafts joined by couplers. Row units are pivotally connected to a cross auger housing for pivoting about the axis of the cross shaft and can slide on the housing and relative to the drive shaft to accommodate different row spacings. An individual slip clutch and a single bevel gear assembly, both of which slide on the cross shaft, drive each row unit and permit relatively easy transverse adjustments of the units. Each slip clutch can be set to the maximum torque requirement for the individual row unit drive unit so that unit protection is significantly increased over systems which have multiple drives on each clutch. A cross shaft extension is added if a single shaft is utilized and harvesting widths are needed which cannot be provided by the original shaft. The harvester header may be extended either to the left or to the right, or both, without modification of the individual row unit drives, and numerous row spacings can be accommodated quickly and easily. With the segmented shaft and couplers, each row unit has an identical shaft, and the couplers have spaced holes to accommodate the different row width. The standardized row unit shaft and coupler provide needed flexibility while minimizing the number of different parts required for various row spacings. Since the shaft stays with the row unit, changing the number of row units on the header and extending the width of the header are easier and there is less opportunity to misplace components.

Each row unit drive extends straight forward from the bevel gear, and a bearing mount extends from a row unit wall immediately adjacent the bevel gear. Universal joints and the associated lubrication requirements and phase shift problems are eliminated. Drive belts with tortuous paths are eliminated. The drive system is lighter and more compact, has better gear mesh and less noise output and is more reliable and cost effective than most previously available drive systems.

These and other objects, features and advantages of the present invention will become apparent to one skilled in the art upon reading the following detailed description in view of the drawings.

DETAILED DESCRIPTION OF THE DRAWINGS

Figure 1:
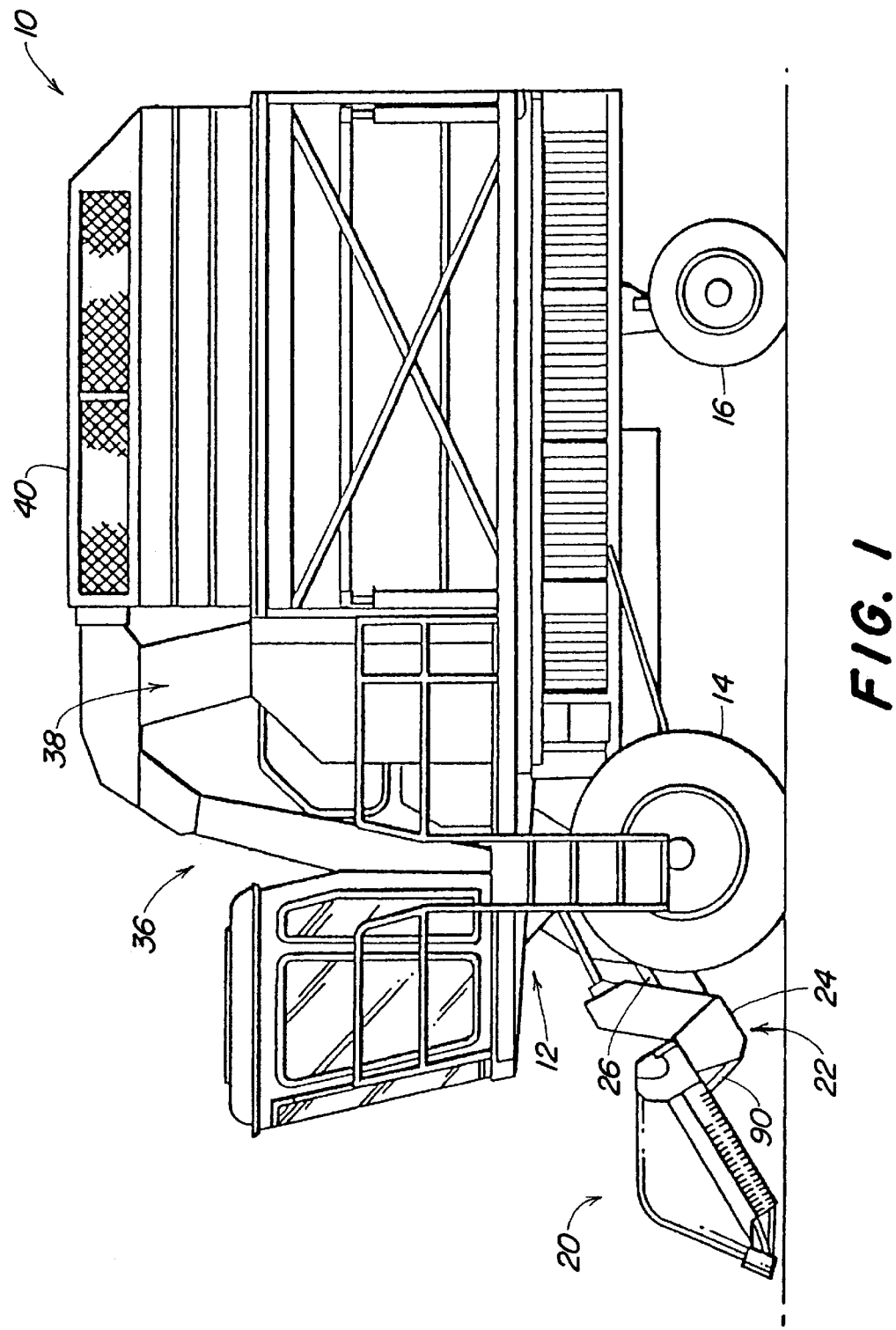
FIG. 1 is a side view of a cotton harvester having a header supporting transversely adjustable row units.

Referring now to FIG. 1, therein is shown a cotton harvester 10 of the stripper type having a main frame 12 supported by front drive wheels 14 and rear steerable wheels 16 for forward movement through a field planted with parallel rows of cotton plants. A plurality of stripper row units 18 are supported from a header assembly 20 including a transversely extending cross auger 22 having a cross auger frame 24 connected by lift arms 26 on the front of the frame 12. The units 18 include fore-and-aft extending stripping structure 28 for removing portions of the cotton plants from the row, and conveying structure 30 for carrying the removed material rearwardly and depositing the material into the cross auger 22. The cross auger 22 includes counter-rotating flights 32 for moving the deposited material inwardly to a central outlet location at the rear of the auger housing where an air duct system 36 moves the cotton upwardly and rearwardly towards a cleaner 38 and a basket 40 supported on the frame 12. The header assembly 20 can be configured with different extensions and numbers of row units 18 to provide four-, five-, six- and eight-row capacity in row spacings that vary between thirty inches (76 cm) and forty inches (100 cm), as well as several skip row patterns. The row units 18 are transversely adjustable on the auger frame 24 to provide the desired unit spacings.

Each of the row units 18 (FIGS. 2–5) includes a frame assembly 40 having a rear structural member 42 with an upright transverse panel 44. A pair of transversely spaced supports 48 are cantilevered from the lower portion of the rear structural member 42. The supports 48 extend forwardly to define a central row-receiving area 50 and a pair of auger troughs 58 outwardly adjacent the stripping structure 28.

The stripping structure 28 includes a generally conventional brush or stripper rolls 60 supported for rotation about fore-and-aft extending axes 62. Outwardly of each stripper roll 60, an auger 70 is supported for rotation about an axis 72 above the corresponding auger trough 58. Stripper roll and auger drive structure 76 is located behind the panel 44 and powers the stripping structure 28 and augers 70. Row unit covers 78 (FIG. 1) are supported on either side of the row-receiving area 50 above the troughs 58. With the exception of the area of the row unit adjacent the panel 44 and the drive structure 76, the harvester 10 and row unit 18 is generally of conventional construction and may be of the type shown and described by commonly assigned U.S. Pat. No. 5,394,679.

The row unit 18 is pivotally connected to the cross auger frame 24 by a transversely adjustable bracket assembly 80 (FIG. 2) supported on a guide rail 82. A bearing assembly 84 on each side of the row unit 18 is received within a corresponding opening on the upper end of sidelegs on the assembly 80 for rocking about a transverse axis 88. The assembly 80 is secured against the rail 82 in the desired position by bolts (not shown) which can be loosened to facilitate sliding of the assembly 80 to the desired position for a given row spacing. The assembly 80 is secured at the desired location for a given row spacing by installing a bolt (not shown) through apertures in the assembly and in a top angle piece on the cross auger frame 24. This structure helps locate the row unit 18 and maintain alignment between adjacent units.

A height control cylinder 90 is connected between the lower portion of the row unit 18 and the cross auger 22 for pivoting the unit about the axis 88 and maintaining the unit at the optimum location above the ground for harvesting cotton from the plants. The harvester header 20 is movable vertically by a conventional lift arm cylinder structure (not shown) operable connected to the lift arm structure 26 to the harvester frame 12 for moving the row units 18 vertically between transport and field-working positions. A rockshaft 91 is connected to a conventional automatic height control including ground sensing shoes (not shown) to maintain the row units 18 at the desired distance above the ground.

Figure 3:
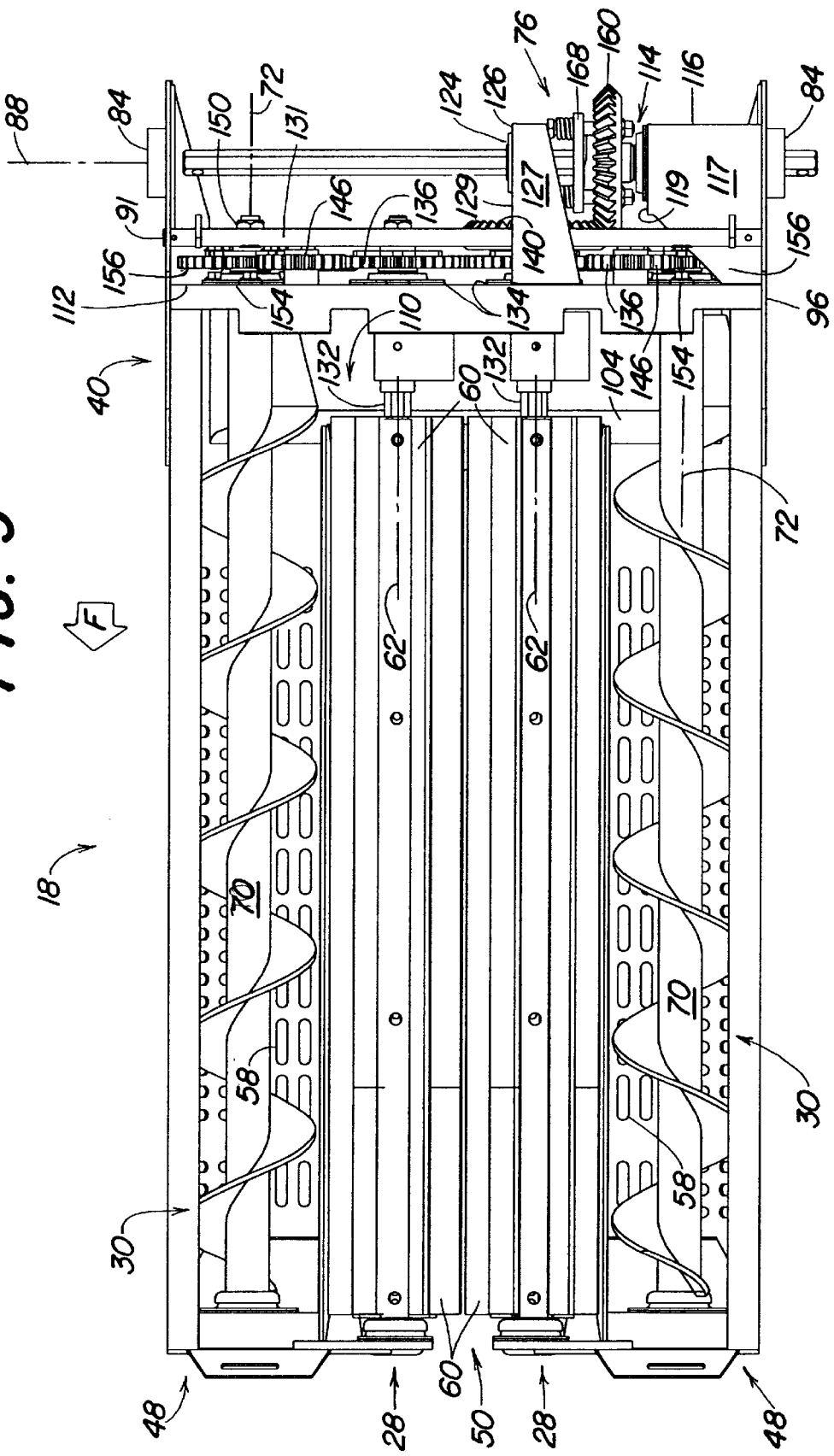
FIG. 3 is an enlarged top view of one of the row units of FIG. 2.
Figure 4:
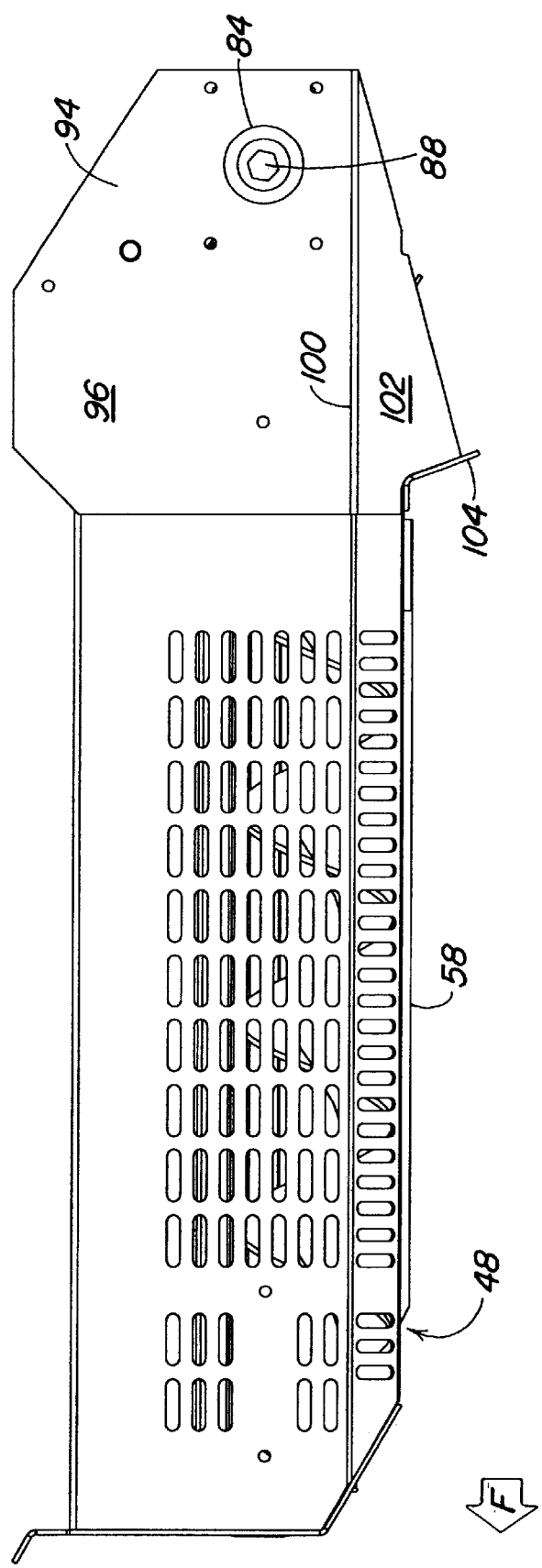
FIG. 4 is a side view of the row unit of FIG. 3.

The bearing assemblies 84 are supported in reinforced areas 94 of opposite rear sidewalls 96 of the row unit housing. The sidewalls 96 extend vertically from locations above the top of outside portions of the auger troughs 58 to bend locations 100 just below the reinforced areas 94. Angled portions 102 extend forwardly to junctures with a transversely extending angle 104 located at the aft ends of the brush rolls 60 and the augers 70. A crop receiving opening indicated generally at 110 in FIG. 3 is defined above the cross auger 22 between the angle 104 and a transverse upright wall 112 extending between the sidewalls 96.

A left support bearing assembly 114 is supported inwardly adjacent the left sidewall 96 (as viewed in the forward direction in FIG. 5) by a channel-shaped support 116 having an upper panel 117 connected along its length to the sidewall 96 and a lower panel 118 fixed to the corresponding angled portion 102. A planar wall 119 extends between the panels 117 and 118 and includes a slot 120 which receives and centers the bearing assembly 114 relative to the pivot axis 88.

A bearing assembly 124 is offset inwardly from, and lies on the axis 88 in alignment with, the assembly 114. A channel-shaped support 126, which opens towards the assembly 114, includes an upper panel 127 having a forward end fixed to the upright wall 112. A lower panel 128 includes a forward end fixed to the wall 112. A planar wall 129 extends parallel to the wall 119 and includes a slot 130 which receives and supports the bearing assembly 124. The above-described construction provides a strong and rigid but relatively light box-like mounting for the bearing assemblies 114 and 124.

Figure 2:
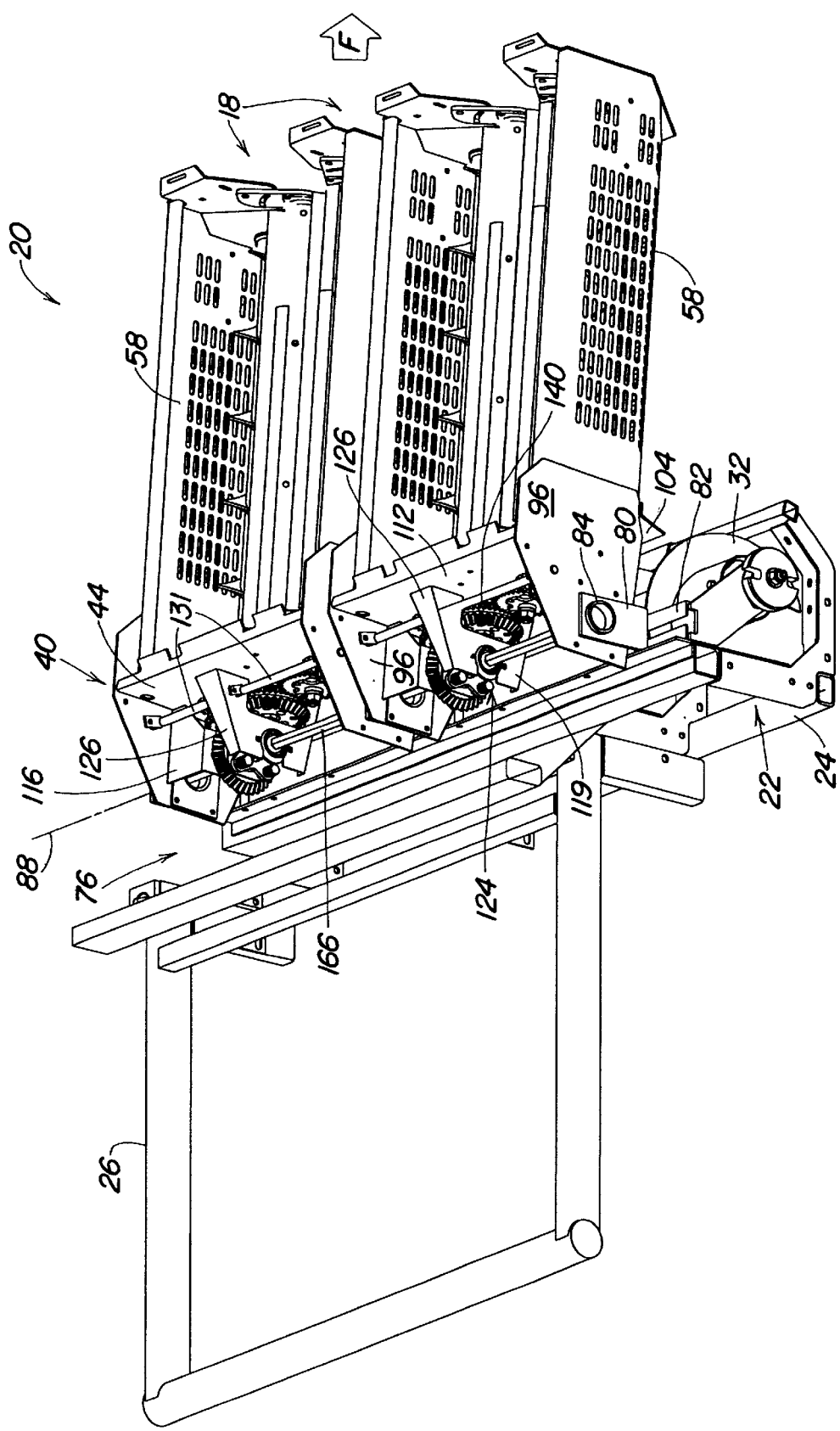
FIG. 2 is a perspective view of a portion of the header on the harvester of FIG. 1 with parts removed to better show the adjustable drive system for the row units.
Figure 5:
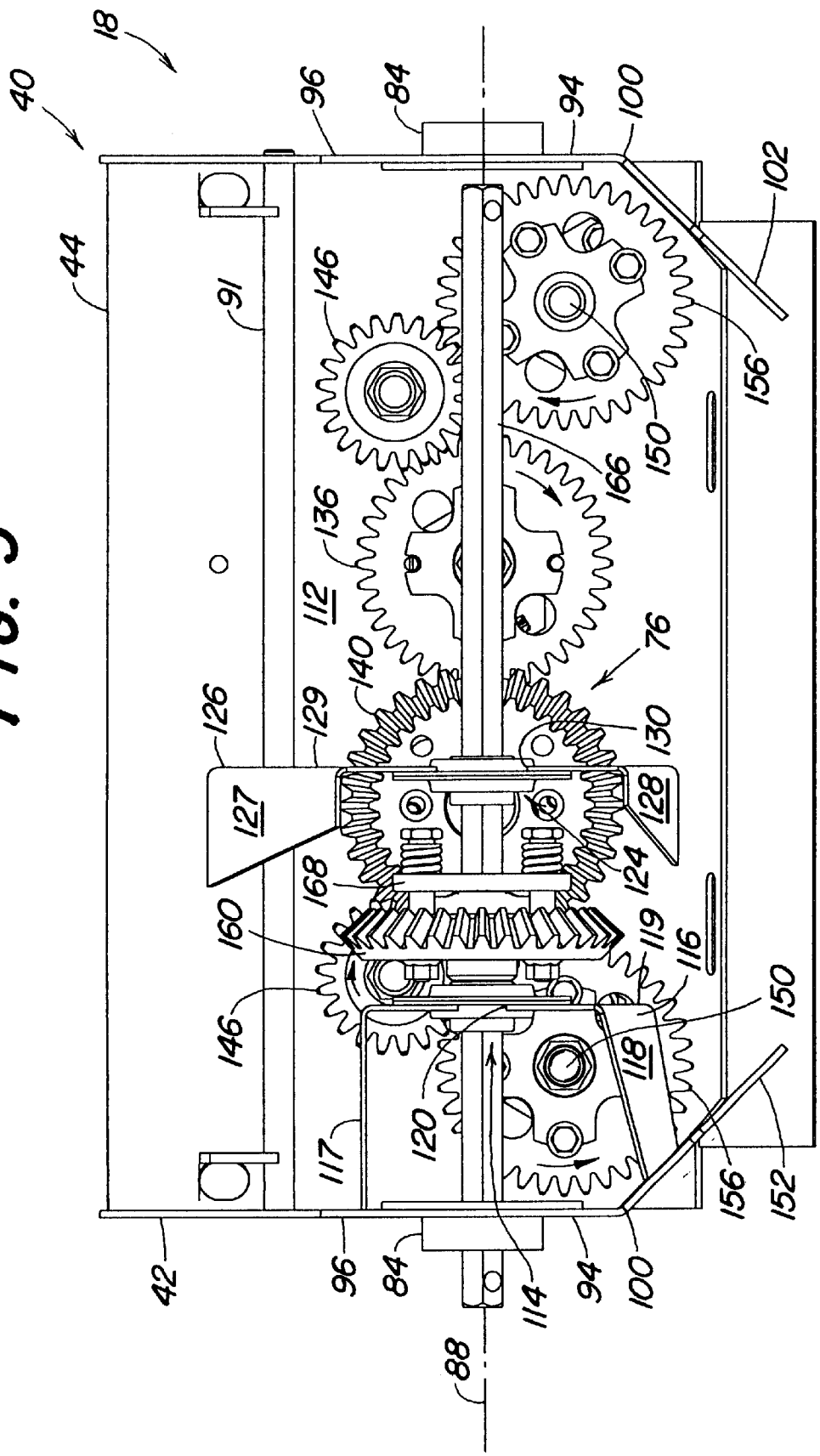
FIG. 5 is an enlarged end view of the row unit of FIG. 3

The stripper rolls 60 include support shafts 132 extending through bearings 134 supported by the wall 112 and connected to identical drive gears 136 located adjacent the wall 112. The drive gears 136 mesh so the rolls 60 counter-rotate about the parallel axes 62. A bevel gear 140 is fixed directly to the left shaft 132 for rotation with the gears 136 about the left axis 62. As best seen in FIGS. 2 and 5, the wall 119 is includes an opening which accommodates the gear 140. Idler gears 146 supported outwardly of and above the axes 62 on the wall 112 mesh with the corresponding gears 136 for rotation about axes parallel to the axes 62. The aft ends of the augers 70 include drive shafts 150 which extend through bearings 154 and are connected to auger drive gears 156 which mesh with the idler gears 146. The gears, stripper rolls and augers all rotate about parallel, fore-and-aft extending axes which run perpendicular to the wall 112 and to the axis 88.

A bevel drive gear 160 is supported between the bearing assemblies 114 and 124 for rotation about the transverse pivotal axis 88 by a hexagonal drive shaft 166 via slip clutch 168. The support bearing assembly 114 maintains gear 160 and the clutch 168 in a fixed transverse relationship with the remainder of the row unit. The gear 160 meshes with the bevel gear 140 and drives the brush rolls 60 and augers 70. The rolls 60 counter-rotate and strip cotton and other plant material from the row of cotton plants entering the row-receiving area 50. The stripped material is directed towards the augers 70 which convey the material rearwardly through the opening 110 and into the cross auger 22.

The hexagonal drive shaft 166 may be a single component or may be sectioned, and the length of the shaft is chosen to correspond to the desired row configuration. To change the row spacing, the operator simply loosens the support assembly 80 on the rail 82 and slides the row unit 18 to the proper position. The bevel gear 160 and the slip clutch 168 move with the unit 18 and slide along the drive shaft 166 so the gears 140 and 160 constantly remain in driving relationship to each other. The drive arrangement allows header extensions to be added to either side of the harvester, and a wide variety of row spacing and row capacity combinations are available.

Having described the preferred embodiment, it will become apparent that various modifications can be made without departing from the scope of the invention as defined in the accompanying claims.

What is claimed is:

1. In a harvester having a frame adapted for forward movement over fields of plants wherein the transverse spacing of the plants varies from field to field, a transverse support connected to the frame and supporting a harvesting unit having a driven harvesting mechanism, a drive system for driving the mechanism and facilitating transverse adjustment of the harvesting unit, the drive system comprising:

a transversely extending drive shaft rotatable about a shaft axis;

a support connecting the harvesting unit to the frame for pivoting about the shaft axis and for transverse adjustment of the harvesting unit relative to the frame;

a support bearing assembly supported from the harvesting unit for transverse adjustment in unison with the harvesting unit;

a slip clutch supported from the support bearing assembly on the shaft for rotation with the shaft, the slip clutch receiving the shaft and slidable transversely on the shaft as the harvesting unit and the support bearing assembly are adjusted transversely so that the slip clutch remains in a fixed transverse relationship relative to the row unit as the row unit is adjusted transversely;

a bevel gear connected to the slip clutch for rotation with the slip clutch about the axis and slidable transversely on the shaft with the slip clutch;

a mating gear connected to the harvesting mechanism and meshing with the bevel gear, the bevel gear remaining in constant mesh with the mating gear as the harvesting unit is adjusted transversely; and wherein the slip clutch transmits torque from the drive shaft to bevel gear and the mating gear up to a torque limit.

2. The drive system as set forth in claim 1 wherein the mating gear is connected to the harvesting system for rotation about a fore-and-aft extending axis extending perpendicular to the shaft axis.

3. The drive system as set forth in claim 1 wherein the harvesting system includes first and second transversely offset stripping rolls connected for rotation about fore-and-aft extending first and second axes, and the mating gear is connected directly to the first stripping roll for rotation about the first axis.

4. The drive system as set forth in claim 1 wherein the support bearing assembly includes first and second bearing mounts fixed to the harvesting unit for transverse movement therewith, and wherein the drive shaft extends through the bearing mounts and the slip clutch and bevel gear are slidably supported on the drive shaft between the bearing mounts.

5. The drive system as set forth in claim 4 wherein the bearing mounts comprise channel shaped members providing a rigid box frame construction to an area adjacent the bevel gear and mating gear so that gear backlash and noise are minimized.

6. The drive system as set forth in claim 4 wherein the bearing mounts include a planar bearing support wall defining a plane which intersects the mating gear for firm support of the shaft adjacent meshing portions of the bevel gear and the mating gear.

7. In a harvester having a frame adapted for forward movement over fields of plants wherein the transverse spacing of the plants varies from field to field, a transverse support connected to the frame and supporting a harvesting unit having a driven harvesting mechanism supported in a housing, a drive system for driving the mechanism and facilitating transverse adjustment of the harvesting unit, the drive system comprising:

a transversely extending drive shaft rotatable about a shaft axis;

a transversely adjustable support connecting the harvesting unit to the frame for pivoting about the shaft axis and for transverse adjustment of the harvesting unit relative to the frame;

a drive gear mounted on the drive shaft and connected for rotation with the drive shaft about the axis, the drive gear and the shaft slidable transversely relative to each other;

a mating driven gear connected to the harvesting mechanism and meshing with the drive gear, the mating driven gear rotatable about a generally fore-and-aft extending axis; and bearing mounts connected to the harvesting unit and supporting the drive shaft at transversely spaced locations, wherein the drive gear is supported on the harvesting unit for transverse adjustment with the harvesting unit and receives the drive shaft between the bearing mounts; and wherein the drive gear slides along the shaft and remains in mesh with the driven gear as the harvesting unit is adjusted transversely.

8. The drive system as set forth in claim 7 further comprising a slip clutch drivingly connected to the drive shaft between the bearing mounts, and wherein the slip clutch transmits torque from the drive shaft to the drive gear and the mating driven gear up to a torque limit.

9. The drive system as set forth in claim 7 wherein the mating driven gear is connected to a stripper roll of the harvesting system for rotation about a fore-and-aft extending axis extending perpendicular to the shaft axis.

10. The drive system as set forth in claim 7 wherein the harvesting system includes first and second transversely offset stripping rolls connected for rotation about fore-and-aft extending first and second a <es perpendicular to the shaft axis, and the driven gear is connected directly to the first stripping roll for rotation about the first axis.

11. The drive system as set forth in claim 7 wherein the bearing mounts comprise channel shaped members providing a rigid box frame construction to an area adjacent the drive gear and the mating driven gear so that gear backlash and noise are minimized.

12. The drive system as set forth in claim 7 wherein the bearing mounts maintain the drive gear in a preselected transverse location relative to the mating gear.

13. The drive system as set forth in claim 7 wherein the drive gear is supported by at least one of the bearing mounts in a preselected transverse location relative to the driven harvesting mechanism and the mating driven gear extends forwardly from the drive gear.

14. The drive system as set forth in claim 7 wherein one of the bearing mounts includes a fore-and-aft extending wall having an opening accommodating the driven gear.

* * * * *